United States Patent Office 2,811,535
Patented Oct. 29, 1957

2,811,535
PHTHALIDES

Donald D. Wheeler and David C. Young, Midland, Mich., assignors to The Dow Chemical Company, Midland, Mich., a corporation of Delaware No Drawing. Application April 30, 1956, Serial No. 581,333

5 Claims. (Cl. 260—343.3)

This invention is concerned with phthalides having the formula

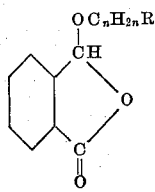

In this and succeeding formulae, R represents a member of the group consisting of carboxy-, carbamido-, cyano-, and carbalkoxy- wherein the alkoxy group contains from 1 to 4 carbon atoms, inclusive, and $n$ is an integer from 1 to 2, inclusive. This invention also includes a method for preparing these compounds. These new compounds are amber colored oils or light colored solids and are soluble in many organic solvents such as benzene, toluene and acetone and generally of low solubility in water. They have utility as microbicides and are adapted to be employed for the control of bacterial and fungal organisms. They are also useful as herbicides and may be employed for the control of plant growth.

These phthalides may be prepared by causing phthalaldehydic acid to react with an appropriate hydroxy compound having the formula $$RC_nH_{2n}OH$$

to produce the desired derivative of 3-hydroxyphthalide and water of reaction. The terms "phthalaldehydic acid" and "3-hydroxyphthalide" refer to a compound having the structure

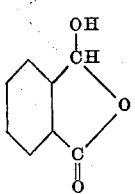

Phthalaldehydic acid is often represented in the literature as having the structure

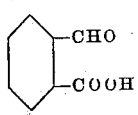

However, the acid employed in this invention and prepared as hereinafter described exists almost entirely in the closed ring 3-hydroxyphthalide structure as observed from a study of its infrared absorption spectrum. Infrared data also indicate the product to have the closed ring 3-hydroxyphthalide structure with the open chain ester sometimes being formed as a by-product.

In the synthesis, good results are obtained when substantially equimolar proportions or an excess of either reactant are employed. However, phthalaldehydic acid, if used in large excess or under conditions of high temperature, may form an anhydride by-product. The reaction takes place smoothly in the temperature range of from 15° to 150° C. but a range of from 90° to 140° C. is considered preferable from a practical standpoint such as rate of reaction or convenience of operation. Solvents such as benzene and toluene may be employed as reaction medium, if desired. The product obtained may be separated from the water of reaction by vaporization of the latter.

In the preferred method of carrying out the reaction, phthalaldehydic acid and an equimolar proportion or an excess of the appropriate hydroxy compound are mixed and heated until the water of reaction begins to reflux and maintained under reflux from 0.5 to 7 hours. The solution is allowed to cool and then poured into water whereupon an insoluble oil or solid precipitates. The water is decanted from the oil or solid product and the latter washed with warm water. The product, if a liquid, is dissolved in benzene and the resulting solution heated to distill first any remaining water as a benzene-water azeotrope and then to remove the solvent. The remaining oily product may be further purified, if desired, by fractional distillation under reduced pressure. The product, if a solid, is filtered from the aqueous mixture and dissolved in a solvent such as methyl ethyl ketone to remove insoluble impurity. The solution of the product may be heated to distill the solvent and to obtain the desired product.

In an alternative method, phthalaldehydic acid and an equimolar proportion or an excess of the appropriate hydroxy compound are mixed and heated from 120° to 150° C. for 1 to 3 hours. The pressure of the system is then reduced and the water of reaction removed by distillation. The crude product is obtained as a residue and, if desired, may be purified by distillation under reduced pressure.

The following examples illustrate the invention but are not to be construed as limiting.

*Example 1.—Phthalidyloxyacetic acid*

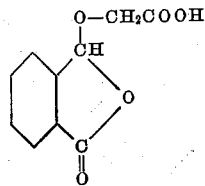

38 grams (0.5 mole) of glycolic acid and 79 grams (0.5 mole) of phthalaldehydic acid were mixed and heated until refluxing is observed and maintained at that temperature over a period of one hour. The system was evacuated to about 15 to 20 millimeters pressure and the water removed by heating the mixture to 160° C. over a one hour period. The mixture was allowed to cool to 70° C. and then poured into water whereupon a very viscous oil separated. The water was decanted therefrom and the residue washed. After the washing, the residual oil was dissolved in benzene and the benzene solution distilled to remove any remaining water as a benzene-water azeotrope and to obtain as residue a 3-phthalidyloxyacetic acid product. The crude acid product was purified by (1) dissolving in aqueous sodium bicarbonate, (2) precipitating the product by acidifying the bicarbonate solution, and (3) separating the oil from the aqueous solution by decantation. Further product was extracted from the aqueous solution with benzene and recovered therefrom by vaporization of the solvent. The products were combined, redissolved in benzene, and heated to distill water and benzene to recover the product as a yellow oil.

*Example 2.—Ethyl 2-phthalidyloxypropionate*

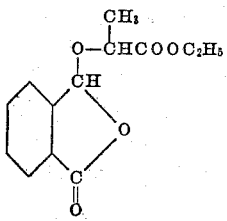

59.0 grams (0.5 mole) of ethyl lactate and 75 grams (0.5 mole) of phthalaldehydic acid were mixed and heated to about 120° C. and maintained under reflux for four hours. The solution was poured into water whereupon an oil precipitated. Benzene was added to the mixture to extract the oil. The benzene solution was then heated to distill benzene and traces of water, and obtain as residue 62 grams (50 percent yield) of an amber-colored, oily ethyl 2-phthalidyloxypropionate product having a refractive index $n_D^{20}$ of 1.5259.

*Example 3.—3-carbamoylmethoxyphthalide*

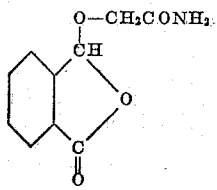

37.5 grams (0.5 mole) of glycolamide and 75 grams (0.5 mole) of phthalaldehydic acid were mixed and heated from 120° to 130° C. under reflux for four hours. The mixture was cooled to 100° C. and poured into 600 milliliters of water whereupon a gummy solid precipitated. The water was decanted therefrom and the solid washed with water and then dissolved in 400 milliliters of methyl ethyl ketone. The resulting solution was filtered to eliminate insoluble material and the filtrate heated to distill the solvent and obtained 73 grams (70 percent yield) of an amber-blue fluorescent viscous oily 3-carbamoylmethoxyphthalide product. The latter had a refractive index $n_D^{60}$ of 1.5697.

*Example 4.—3-(2-cyanoethoxy)phthalide*

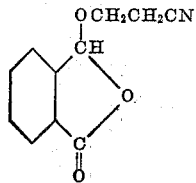

35.5 grams (0.5 mole) of hydracrylonitrile and 75 grams (0.5 mole) of phthalaldehydic acid were mixed and heated from 130° to 140° C. under reflux for four hours. The solution was cooled to 100° C. and poured into 700 milliliters of water whereupon an oily 3-(2-cyanoethoxy)phthalide product precipitated. The latter was separated from the water and washed. During the washing process, the oil solidified. The mixture was filtered to recover the solid and the latter washed with water and dried at about 15 millimeters pressure. The dried tan-colored solid product, melting from 95° to 98° C., amounted to 47.5 grams or a 47 percent yield.

In similar preparations, derivatives of 3-hydroxyphthalide may be prepared as follows:

2-phthalidyloxypropionic acid by the reaction of lactic acid with phthalaldehydic acid.

Butyl phthalidyloxyacetate by the reaction of butyl glycolate with phthalaldehydic acid.

3-(1-carbamoylethoxy)phthalide by the reaction of lactonamide with phthaldehydic acid.

Methyl phthalidyloxyacetate by the reaction of methyl glycolate with phthalaldehydic acid.

The microbicidal properties of these compounds may be illustrated by a representative example wherein a solid agar medium saturated with 3-carbamoylmethoxyphthalide gave complete inhibition of growth when streaked with *Staphylococcus aureus* and incubated at 30° C. for three days.

The phthalaldehydic acid employed in this invention may be prepared by photochlorinating o-xylene to obtain $\alpha,\alpha,\alpha',\alpha'$-pentachloro-o-xylene by passing chlorine gas into o-xylene while the latter is illuminated with sun lamps. The resulting chlorinated o-xylene is then heated with aqueous constant-boiling hydrochloric acid containing 10 percent ferric chloride solution to obtain the phthalaldehydic acid, as more fully disclosed and claimed in a copending application of James D. Head and Owen D. Ivins, Serial Number 279,682, filed March 31, 1952, now Patent No. 2,748,162.

We claim:

1. A phthalide having the formula

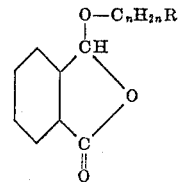

where R represents a member of the group consisting of carboxy-, carbamido-, cyano-, and carbalkoxy- wherein the alkoxy group contains from 1 to 4 carbon atoms, inclusive, and $n$ is an integer from 1 to 2, inclusive.

2. Ethyl 2-phthalidyloxypropionate.
3. 3-carbamoylmethoxyphthalide.
4. 3-(2-cyanoethoxy)phthalide.
5. A method for preparing a phthalide having the formula

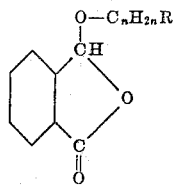

where R represents a member of the group consisting of carboxy-, carbamido-, cyano-, and carbalkoxy- wherein the alkoxy group contains from 1 to 4 carbon atoms, inclusive, and $n$ is an integer from 1 to 2, inclusive, which comprises the step of heating phthalaldehydic acid and a hydroxy compound having the formula, $RC_nH_{2n}OH$, wherein R and $n$ are as specified above, at a temperature of from 90° to 140° C. for a sufficient time to allow completion of the reaction.

No references cited.